United States Patent [19]
Dietz et al.

[11] Patent Number: 5,909,174
[45] Date of Patent: Jun. 1, 1999

[54] CONTROL DEVICE, ESPECIALLY FOR VEHICLE BRAKING LIGHT CONTROL

[75] Inventors: Juergen Dietz, Weinstadt; Armin Staehle, Nufringen; Stefan Woerner, Weinstadt, all of Germany

[73] Assignee: Mercedes-Benz AG, Stuttgart, Germany

[21] Appl. No.: 08/821,043

[22] Filed: Mar. 20, 1997

[30] Foreign Application Priority Data

Mar. 20, 1996 [DE] Germany ............... 196 10 871

[51] Int. Cl.$^6$ .................................................. B60Q 1/44
[52] U.S. Cl. .................... 340/479; 340/468; 340/508; 701/33
[58] Field of Search ................... 340/436, 438, 340/479, 471, 468, 641, 507, 508, 509; 364/424.034, 424.038, 424.045, 424.048, 131, 132; 371/67.1, 68.1; 315/77, 79, 80, 83; 701/30, 33, 36, 39

[56] References Cited

U.S. PATENT DOCUMENTS

| | | | |
|---|---|---|---|
| 3,920,204 | 11/1975 | Bissell et al. | 244/111 |
| 4,199,799 | 4/1980 | Ostenso et al. | 361/78 |
| 4,728,861 | 3/1988 | Kurihara et al. | 315/83 |
| 5,309,314 | 5/1994 | Loreck et al. . | |
| 5,382,877 | 1/1995 | Katsumata et al. | 315/82 |
| 5,384,765 | 1/1995 | Sakagami et al. | 340/458 |
| 5,491,383 | 2/1996 | Leiber et al. | 340/641 |
| 5,629,670 | 5/1997 | Pabla et al. | 340/479 |
| 5,644,290 | 7/1997 | Rhodes | 340/479 |

FOREIGN PATENT DOCUMENTS

| | | |
|---|---|---|
| 1 244 430 | 1/1961 | France . |
| 35 45 924 | 7/1986 | Germany . |
| 39 30 775 | 3/1991 | Germany . |
| 43 08 514 | 9/1993 | Germany . |
| 43 09 316 | 9/1993 | Germany . |
| 42 36 395 | 5/1994 | Germany . |

OTHER PUBLICATIONS

"How Can Processor and Controller Systems be Made More Failure–Resistant?" by S. Storandt, O. Feger, *Elektronik*, vol. 17, Aug. 19, 1988, pp. 72–76.

*Primary Examiner*—Daniel J. Wu
*Assistant Examiner*—Van T. Trieu
*Attorney, Agent, or Firm*—Evenson, McKeown, Edwards & Lenahan, P.L.L.C.

[57] ABSTRACT

A control device is provided with a controllable element and a control unit that delivers an output signal which, when a control command signal applied to the input side is at an activating level, continuously or periodically assumes an activating level and continuously assumes a deactivating level when the control command signal is at a deactivating level or there is a functional failure of the control unit. The control device incorporates a redundancy logic unit that logically links the control command signal with the output signal of the control unit to form the control signal for the controllable element in such fashion that when the output signal of the control unit is continuously at its deactivating level, the control signal, corresponding to the control command signal, is at its activating or deactivating level, while otherwise the control signal is at its activating or deactivating signal level depending on the level of the output signal of the control unit. The control device can be used for controlling the brake lights of a vehicle.

6 Claims, 2 Drawing Sheets

CONTROL DEVICE, ESPECIALLY FOR VEHICLE BRAKING LIGHT CONTROL

This application claims the priority of German Application No. 196 10 871.3, the disclosure of which is expressly incorporated by reference herein.

BACKGROUND AND SUMMARY OF THE INVENTION

The invention relates to a control device and, more particularly, to a control device especially for vehicle braking light control including a control unit that emits an output signal to control a controllable element. The signal, when a control command signal applied on the input side is at an activating signal level, receives an activating signal level continuously or periodically. When the control command signal is at a deactivating signal level or a functional failure of the control unit occurs, the signal assumes a deactivating signal level.

A device of this kind can be used especially for controlling the brake light or lights of a vehicle, with the at least one brake light forming the controllable element that is controlled by a control unit as a function of the control command signal generated in a brake light switch. In order to be able to operate the brake light with different brightnesses when necessary, a pulse-width modulatable clock pulse signal can be provided as a control signal. This type of control for vehicle lights is described for example in German Patent documents DE 43 08 514 A1 and DE 43 41 058 C1.

A device for controlling and monitoring the brake lights of a vehicle as a function of the control state of a brake light switch is known from German Patent document DE 39 30 775 A1, in which the signal generated in a brake light switch is fed to a control and regulating unit that directs a corresponding electrical current to generate the braking light in the brake lights as a function of this signal. At the same time, the functioning ability of the brake lights is monitored by the control and regulating unit, for which purpose it is additionally supplied with the signal from a wheel speed sensor. In the event of a lack of functional ability or detection of braking with an open brake light switch or with brake lights that fail to light up, an error message is generated. The control and regulating unit preferably contains two processors connected in parallel to achieve a reliability-increasing redundancy, said processors, among other things, monitoring the function of an antilock brake system provided in the vehicle. In order to ensure that the brake lights remain supplied with electrical current even if the control and regulating unit should completely fail, it is proposed to arrange an electrical current path with a resistance parallel to the control and regulating unit and between the brake light switch and the brake lights. The resistance is so dimensioned that when the brake light switch is closed the entire current required to activate the brake lights flows through this current path if the control and regulating unit has failed, so that the current path leading from the latter to the brake lights is interrupted.

It is generally known in connection with control devices that incorporate a computer, that in the event of software errors or other problems, the computer can fail even when a so-called watchdog circuit is present, so that the tasks that it is to perform are no longer correctly performed. This situation can have a dangerous adverse effect upon functions that are relevant to safety. It is known in this connection to bring the computer to a defined secure state if it fails, but a state that is completely independent of the input signals and consequently can be improperly adapted to the current situation, for example a general activation of the low beams when the headlights of a vehicle are controlled. It is conventional to design the control device to be redundant as a reliability-increasing measure in such fashion that two or more computer units are used that are functionally identical and operate in parallel, resulting in a corresponding increased cost of implementation; see for example the magazine article by S. Storandt and O. Feger: "How Can Processor and Controller Systems Be Made More Failure-Resistant?" *Elektronik,* Volume 17, Aug. 19, 1988, page 72.

The technical problem which the present invention is concerned with is the provision of a control device of the above-mentioned type, in which, with the lowest possible expense, a redundancy is created in order to increase the reliability and availability of the device.

This problem is solved by a control device especially for vehicle braking light control including a control unit that emits an output signal to control a controllable element. The signal, when a control command signal applied on the input side is at an activating signal level, receives an activating signal level continuously or periodically. When the control command signal is at a deactivating signal level or a functional failure of the control unit occurs, the signal assumes a deactivating signal level. A redundancy logic unit logically links the control command signal with the output signal of the control unit in such fashion as to form the control signal for the controllable element such that when the output signal of the control unit is continuously at its deactivating signal level, the control signal is at its activating level with the control command signal at its activating signal level. The control signal is at its deactivating level when the control command signal is at its deactivating signal level. Otherwise, the control signal is at its activating or deactivating signal level in accordance with the output signal of the control unit.

In this device, a redundancy device in the form of a simple redundancy logic unit is provided that logically links the control command signal with the output signal of the control unit to form the control signal for the controllable element in such fashion that when the output signal of the control unit is continuously at the deactivating signal level, the control signal, in accordance with the control command signal, is at its activating or deactivating signal level, while otherwise the control signal has a signal level that follows that of the output signal of the control unit. Such a redundancy logic unit clearly requires much less implementation expense than providing two or more parallel control units. It is understood that the terms "activating and deactivating signal level" refer to a level that requires activation or deactivation of the controllable element to be performed. The activating signal level for the various signals does not have to be a uniform level, but can have a low level for one signal and a high level for another signal for example. The same applies to the deactivating signal level.

Advantageously, the redundancy logic unit meets the requirements imposed on a control device of the present type in a relatively simple fashion. If the control unit is functionally reliable, when the control command signal applied on the input side is at the activating signal level, it delivers an output signal that, depending on the individual application and the corresponding system design, is located continuously, or in the form of a clock pulse signal, but in any event during certain periodic intervals, at the activating signal level. This means that the controllable element is activated in a desired fashion. As long as this situation prevails, the redundancy logic unit permits the activation or deactivation requirement of this output signal of the control unit for the control signal of the controllable element to go through. When the output signal of the control unit is located continuously at the deactivating signal level, although the requesting control command signal is at the activating signal level, the redundancy logic unit interprets this as a failure of the control unit and in this case maintains an emergency operation of the controllable element by virtue of the fact that it uses the respective activating or deactivating requirement, as contained in the control command signal, as the control signal of the controllable element. For example, in a control device for controlling the vehicle braking light, in the event of failure of the control unit which normally controls the brake lights, with a pulse-width modulated clock pulse signal and with a variable brightness if necessary, the brake lights are switched by the redundancy logic unit at least to their maximum brightness state when the corresponding brake light switch is closed.

In an advantageous embodiment of the invention, the redundancy logic unit contains an RC element which, in a manner that is simple from a circuitry standpoint, ensures that in the application in which the output signal from the control unit is a pulse-width modulated clock pulse signal, the intervals in which this output signal is not at the activating signal level but at the deactivating signal level are not interpreted as a failure of the control unit. The redundancy logic unit determines that such a failure has occurred only when the output signal from the control unit, when the control command signal is at the activating signal level, remains significantly longer than this blanking interval at the deactivating signal level, whereby the time duration relevant for failure detection is determined by the discharge time constant of the RC element.

It is a further advantage of the invention to provide a control device for vehicle braking light control with a low circuit cost.

Other objects, advantages and novel features of the present invention will become apparent from the following detailed description of the invention when considered in conjunction with the accompanying drawings.

DETAILED DESCRIPTION OF THE DRAWINGS

Figure 1:
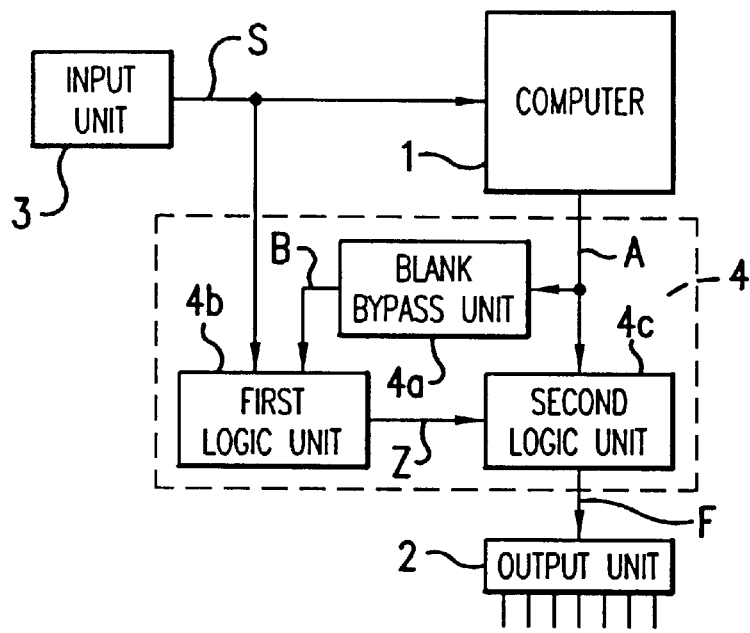
FIG. 1 is a schematic diagram of a device for controlling the brake lights of a vehicle.

FIG. 1 shows a control device for vehicle braking light control in a schematic diagram. The device comprises a computer 1, an output unit 2, an input unit 3, and a redundancy logic unit 4. The device receives a control command signal S through input unit 3, said signals being generated by a brake light switch not shown in FIG. 1 as a binary coded signal indicating the control state of this switch. When the computer 1 is operating and functionally reliable, it generates a binary coded output signal A as a function of the control command signal S supplied on the input side. More precisely, this output signal A continuously remains at a deactivating signal level, for example a low level, when the brake light switch is open, and thus the control command signal S applied on the input side is also at a deactivating signal level, for example a high level, by which the off state of the brake lights controllable by output unit 2 is called for. If on the other hand the brake light switch is closed and thus control command signal S is at an activating signal level, for example a low level, then the computer 1 generates as the output signal A a signal which, depending on the system design which in turn depends upon the individual application, as a function of additional parameters, is continuously at its activating signal level, for example a high level, or is a pulse-width modulated clock pulse signal whose signal level alternates between the activating and deactivating levels.

The latter measure can be used to control the brake lights with variable brightness, with the brightness depending on the blanking ratio of the clock pulse signal. Such a dimmed control of the brake lights can also be provided by the computer 1 if necessary independently of control command signal S of the braking light switch for the purpose of providing a substitute circuit in the event of the failure of another vehicle light. For example, provision can be made, in the event of a failure of the vehicle tail light detected by the computer 1, said tail light having a wattage of 10 W for example, instead to activate the two vehicle brake lights, which for example have a wattage of 21W each, with 5W each by means of a corresponding pulse-width modulated clock pulse signal. Thus, the two brake lights would be dimmed. Of course the computer 1 can be set up in a conventional manner, not shown, to meet additional control functions, especially for controlling additional vehicle lights. The redundancy logic unit 4 serves to ensure at low cost the activation of the brake lights when the brake light switch is closed, even if the computer 1 fails, which in this case, independently of the control command signal S applied on the input side and other vehicle state parameters, delivers a signal that continuously remains at the deactivating signal level as a braking-light-relevant output signal A.

Figure 2:
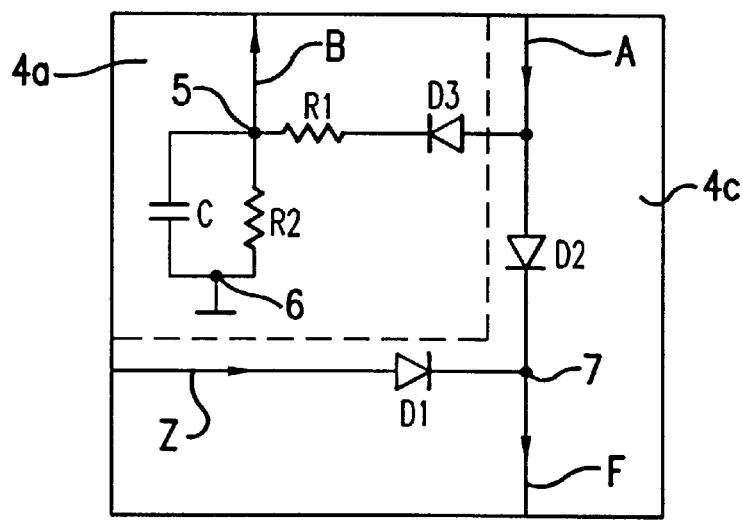
FIG. 2 is a more detailed circuit diagram of a part of the redundancy logic unit used in FIG. 1.

The redundancy logic unit 4 is composed for this purpose of three circuit components, namely a blanking bypass unit 4a, a first linking logic unit 4b, and a second linking logic unit 4c, with the first 4a and last 4c components being connected together in a circuit in the manner shown in detail in FIG. 2. As shown in FIGS. 1 and 2, the computer output-signal A is fed firstly to second linking logic unit 4c and secondly to blanking bypass unit 4a. The latter has a diode D3 and a resistor R1 in series, through which the computer output signal A present on the input side is supplied to a connecting node 5 of a connected RC element, that includes a capacitor C and a resistor R2 in parallel between this connecting node 5 and a ground connecting node 6. The signal B applied to connecting node 5 forms the output signal of blanking bypass unit 4a that is supplied to the first linking unit 4b to which the control command signal S is also supplied in parallel to the computer 1.

The blanking bypass unit 4a, in those cases in which the computer 1 delivers a pulse-width modulated clock pulse signal as output signal A, serves to prevent the redundancy logic unit 4, when this clock pulse signal is at the deactivating signal level, from incorrectly concluding that the computer has failed. For this purpose, elements of the blanking bypass unit 4a are suitably dimensioned so that their output signal B quickly reacts to a change in the computer output signal A to the activating signal level and only with a delay that is at least the maximum blanking interval to a change in the latter from the activating to the deactivating signal level. When, in order to give a practical example, the activating signal level of the computer output signal A is a high level and the deactivating signal level is a low level, the blanking bypass unit 4a is so dimensioned that capacitor C is rapidly charged through the series circuit composed of diode D3 and resistor R1 when the computer output signal A changes to the high signal level, while after the subsequent change of the computer output signal to the low signal level, capacitor C discharges through resistor R2 of the RC element slowly so that the output signal B applied to connecting node 5 during the blanking interval of the computer output signal, remains essentially constant at the high activating signal level. In this manner, the blanking intervals of the computer output signal A are blanked in the output signal B of the blanking bypass unit 4a. If on the other hand the computer output signal A continuously remains at a high or low signal level, the output signal B of blanking bypass unit 4a assumes the signal level of the computer output signal A.

The first linking logic unit 4b links the output signal of blanking bypass unit 4a with the control command signal S by means of a simple logical link, for example a logical AND link of the inverse of the output signal B of the blanking bypass unit 4a with the inverse of the control command signal S, to an intermediate signal Z that feeds it to the second linking logic unit 4c. The second linking logic unit 4c is formed as a wired OR link in the form of two diodes D1, D2 that are brought together on the output side to form an output node 7, with the one diode D1 receiving the intermediate signal Z from the first linking logic unit 4b and the other diode D2 receiving the computer output signal A. The second linking logic unit 4c delivers a control signal F at its output node 7 that is supplied as the critical signal to the brake light control of output unit 2.

In general, with the described design of the redundancy logic unit 4, and with the control command signal S at the activating signal level, whenever the computer output signal A is continuously or periodically in the form of a clock pulse signal at least temporarily at the activating signal level, the control signal F for the brake lights corresponds to this computer output signal A, while otherwise, that is with computer 1 failed and therefore continuously at the deactivating signal level, the control signal F corresponds to the activating or deactivating state of the control command signal S generated by the brake light switch. In the latter emergency operating case, therefore, the redundancy logic unit 4, when a failure of computer 1 is recognized, maintains a direct brake light control corresponding to the actuation of the brake light switch in a simple fashion from a circuitry standpoint.

Figure 3:
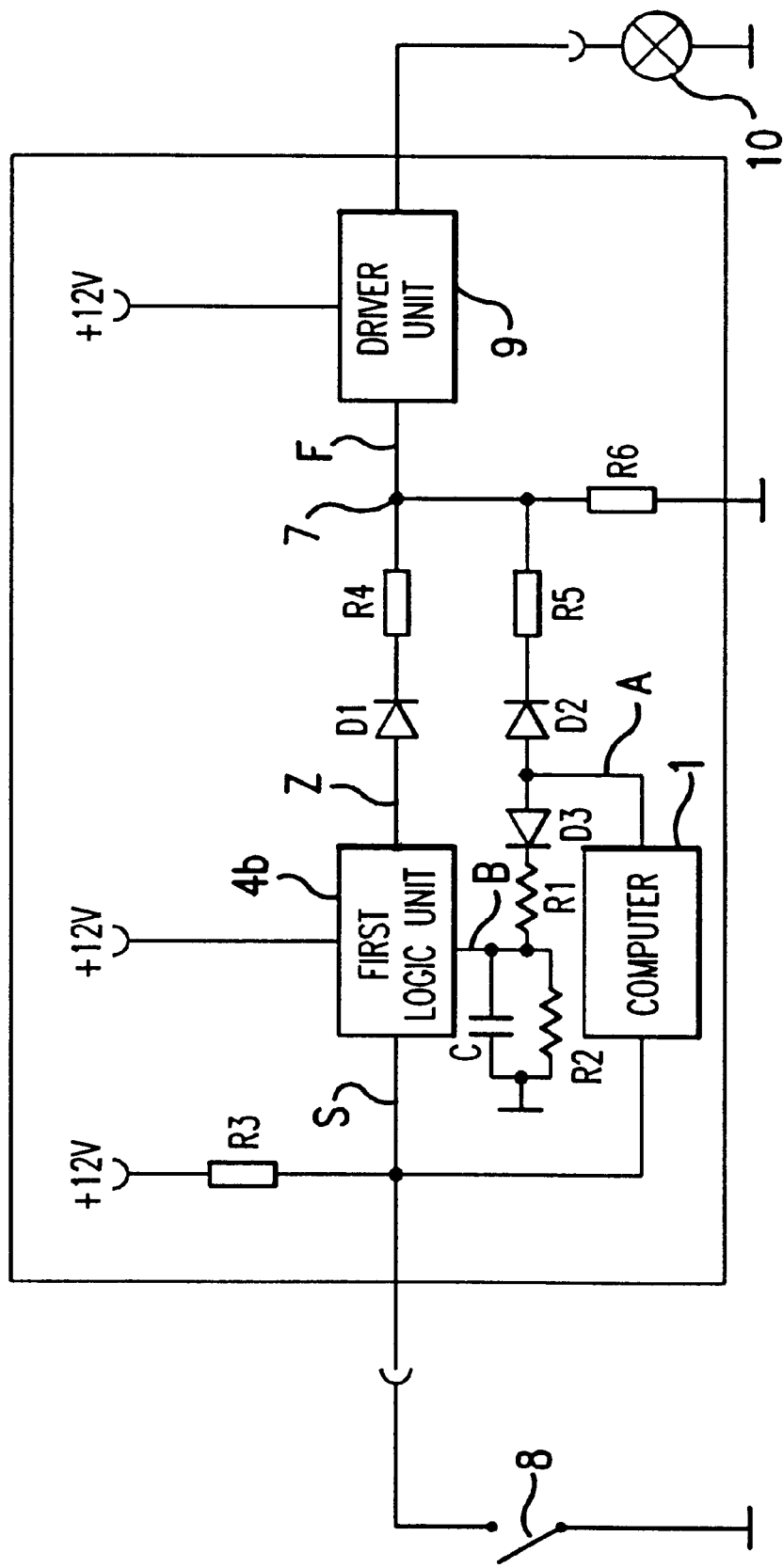
FIG. 3 is a detailed schematic diagram of the device according to FIGS. 1 and 2.

FIG. 3 shows a specific embodiment in the form of a circuit for the entire control device for vehicle braking light control according to FIGS. 1 and 2, with functionally corresponding elements having the same reference numerals. As can be seen in FIG. 3, the device incorporates a brake light switch 8. In the open state, the brake light switch 8 generates a deactivating control command signal that is at a high signal level of +12V, and in the closed state generates an activating control command signal that is at a low signal level of 0V. The high signal level is therefore supplied by a +12V voltage supply and a series resistor R3. The first linking logic unit 4b of the redundancy logic unit, which is also connected to the voltage supply, performs an AND linking of the inverse of the incoming control command signal S with the inverse of the output signal B provided by the blanking bypass unit to create the intermediate signal Z. Through one of the diodes D1 and a resistor R4, the intermediate signal Z within the second linking logic unit is OR-linked with the output signal A of the computer 1, which is conducted through its other diode D2 and another resistor R5, to the output node 7. This output node 7 is connected through another resistor R6 with the ground connection. The control signal F which is applied to this output node 7 of the redundancy logic unit is fed to a light driver unit 9 that is likewise connected to the +12V voltage supply and controls the brake lights, of which one brake light 10 is shown as a representative example. The brake lights are controlled as a function of this control signal F. More precisely, the driver unit 9 brings the brake lights 10 into their illuminating state when the control signal F is at the activating, high signal level, while it holds the brake lights 10 in their non-illuminating state in those operating phases in which the control signal F is at the deactivating low signal level.

Of course, control devices according to the invention are not only suitable as described for computer-failure-protected, redundant control of vehicle brake lights, but of course also for other lights of a vehicle as well as for all applications even outside the field of motor vehicle technology, in which a controllable element is normally controlled by a computer by means of continuous or clock pulse signals. With such a device, this element can be controlled directly in emergency operation in the event of failure of a computer in accordance with a control command signal applied on the input side. If the computer output signal does not include any clock pulse signals but only continuous control signals, the blanking bypass unit 4a in the redundancy logic unit 4 described can be omitted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control circuit, comprising:

a control unit providing an output signal to control a controllable element, said output signal, receiving an activating signal level either continuously or periodically when a control command signal applied on an input side of the control unit is at an activating signal level, and said output signal assuming a deactivating signal level when the control command signal is at a deactivating signal level or when a functional failure of the control unit occurs; and a redundancy logic unit coupled to said control unit and logically linking the control command signal with the output signal so as to form a control signal for the controllable element, said redundancy logic unit operating such that when the output signal is continuously at its deactivating signal level, the control signal is at an activating level with the control command signal at its activating signal level, and the control signal being at a deactivating level when the control command signal is at its deactivating signal level, while otherwise the control signal is at an activating or deactivating level in accordance with the output signal of the control unit.

2. A control circuit according to claim 1, wherein the redundancy logic unit operates such that when the output signal is continuously at its deactivating signal level due to a failure of the control unit, the control signal is at an activating level with the control command signal being at its activating signal level, and the control signal being at a deactivating level when the control command signal is at its deactivating signal level.

3. A control circuit, comprising:

a control unit providing an output signal to control a controllable element, said output signal receiving an activating signal level either continuously or periodically when a control command signal applied on an input side of the control unit is at an activating signal level, and said output signal assuming a deactivating signal level when the control command signal is at a deactivating signal level or when a functional failure of the control unit occurs;

a redundancy logic unit coupled to said control unit and logically linking the control command signal with the output signal so as to form a control signal for the controllable element, said redundancy logic unit operating such that when the output signal is continuously at its deactivating signal level, the control signal is at an activating level with the control command signal at its activating signal level, and the control signal being at a deactivating level when the control command signal is at its deactivating signal level, while otherwise the control signal is at an activating or deactivating level in accordance with the output signal of the control unit; and wherein said redundancy logic unit comprises a blanking bypass unit having an RC element which converts the output signal of the control unit into a first signal that normally follows a signal level of the output signal except that said first signal remains at an activating signal level for any time periods in which the output signal of the control unit is only temporarily at the deactivating signal level.

4. The control circuit according to claim 3, wherein said control circuit is a vehicle braking light control circuit, said vehicle braking light control circuit including:

a brake light switch which generates the control command signal;

wherein said control unit is a computer which is able to deliver a pulse-width modulated output signal for braking light control under certain conditions; and wherein said redundancy logic unit comprises a first linking logic unit which logically links the first signal output from the blanking bypass unit with the control command signal, and a second linking logic unit which logical links an output signal generated by the first linking logic unit with the output signal from the computer for providing the control signal as a brake light control signal.

5. A control circuit according to claim 3, wherein the redundancy logic unit operates such that when the output signal is continuously at its deactivating signal level due to a failure of the control unit, the control signal is at an activating level with the control command signal being at its activating signal level, and the control signal being at a deactivating level when the control command signal is at its deactivating signal level.

6. A control circuit, comprising:

a control unit providing an output signal to control a controllable element, said output signal receiving an activating signal level either continuously or periodically when a control command signal applied on an input side of the control unit is at an activating signal level, and said output signal assuming a deactivating signal level when the control command signal is at a deactivating signal level or when a functional failure of the control unit occurs;

a redundancy logic unit coupled to said control unit and logically linking the control command signal with the output signal so as to form a control signal for the controllable element, said redundancy logic unit operating such that when the output signal is continuously at its deactivating signal level, the control signal is at an activating level with the control command signal at its activating signal level, and the control signal being at a deactivating level when the control command signal is at its deactivating signal level, while otherwise the control signal is at an activating or deactivating level in accordance with the output signal of the control unit; and wherein said control circuit is a vehicle braking light control circuit, said vehicle braking light control circuit including:

a brake light switch which generates the control command signals;

wherein said control unit is a computer which is able to deliver a pulse-width modulated output signal for braking light control under certain conditions; and wherein said redundancy logic unit comprises a first linking logic unit and a blanking bypass unit, said first linking logic unit logically linking a first signal output from the blanking bypass unit with the control command signal, and a second linking logic unit which logically links an output signal generated by the first linking logic unit with the pulse-width modulated output signal from the computer for providing the control signal as a brake light control signal.

* * * * *